United States Patent [19]

Sakurai

[11] Patent Number: 4,778,133
[45] Date of Patent: Oct. 18, 1988

[54] SLIDER WHEEL PITCH AND ROLL CONTROL STICK APPARATUS FOR AN AIRCRAFT

[75] Inventor: Seiya Sakurai, Seattle, Wash.
[73] Assignee: The Boeing Company, Seattle, Wash.
[21] Appl. No.: 47,984
[22] Filed: May 8, 1987
[51] Int. Cl.⁴ .................................. B64C 13/04
[52] U.S. Cl. ...................... 244/234; 244/220; 244/221
[58] Field of Search ............... 244/220, 221, 234, 237; 74/492, 493

[56] References Cited

U.S. PATENT DOCUMENTS

| | | | |
|---|---|---|---|
| 1,367,695 | 2/1921 | Gray . | |
| 2,074,334 | 3/1937 | Hughes | 74/493 |
| 2,398,601 | 4/1946 | Seifert | 244/83 |
| 2,442,289 | 5/1948 | Garehime | 244/83 |
| 2,460,374 | 2/1949 | Walls | 244/83 |
| 2,539,753 | 1/1951 | Peterson | 244/83 |
| 2,588,020 | 3/1952 | Libby | 244/83 |
| 2,865,222 | 12/1958 | Bachmann | 74/493 |
| 2,991,963 | 7/1961 | Peterson | 244/83 |
| 3,028,766 | 4/1962 | Musilli | 74/492 |
| 3,209,612 | 10/1965 | Tonnies | 244/234 |
| 3,693,997 | 9/1972 | Dreyer | 280/87 |
| 3,718,053 | 2/1973 | Cinadr | 74/493 |
| 4,537,089 | 8/1985 | Moneta | 74/493 |

FOREIGN PATENT DOCUMENTS

| | | | |
|---|---|---|---|
| 302898 | 9/1916 | Fed. Rep. of Germany | 244/234 |
| 5861067 | 4/1983 | Japan . | |
| 609292 | 9/1948 | United Kingdom | 244/221 |

Primary Examiner—Galen Barefoot
Assistant Examiner—Rodney Corl
Attorney, Agent, or Firm—Bruce A. Kaser

[57] ABSTRACT

A slider wheel housing assembly 10) is provided for mounting an aircraft pitch and roll control stick or shaft (28) to control panel structure (34) in the aircraft's cockpit. The assembly (10) includes a housing (12) having a pair of parallel guide rails (14, 16) that extend along opposite outside surfaces of the housing (12). Each guide rail (14, 16) laterally projects outwardly away from its respective side of the housing (12). Each rail (14, 16) further has first and second beveled outer surfaces (18, 20) which extend along the length of each rail (14, 16). These surfaces (18, 20) provide running surfaces for a plurality of roller wheels (44, 46, 48, 50) which are rotationally mounted to the control panel structure (34). The wheels (44, 46, 48, 50) and guide rails (14, 16) cooperatively hold the housing (12) in the control panel structure (34) while at the same time permitting the housing (12) to translate back and forth, the direction of translation being defined by the direction of the rails (14, 16). Connected to the assembly's housing (12) is the control shaft (28) which translates correspondingly with housing movement. The shaft (28) is connected to the assembly's housing (12) in a manner so that it can also rotate for roll control as well as translate for pitch control.

4 Claims, 3 Drawing Sheets

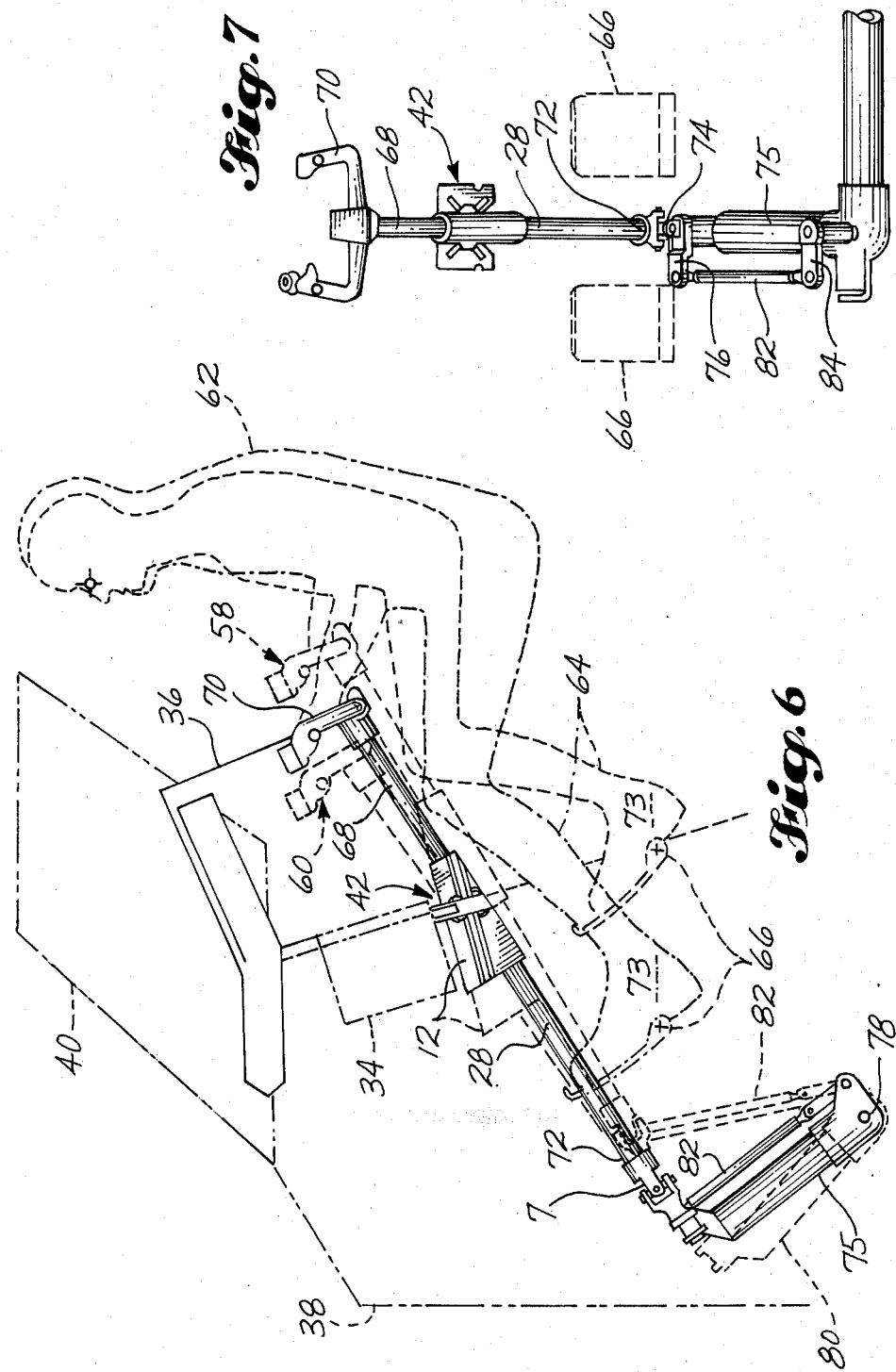

SLIDER WHEEL PITCH AND ROLL CONTROL STICK APPARATUS FOR AN AIRCRAFT

DESCRIPTION

1. Technical Field

This invention relates to mechanical steering control mechanisms for use in an aircraft cockpit to control the direction of aircraft movement. More particularly, the invention relates to control stick or control wheel mechanisms that are pilot operated for controlling aircraft pitch and roll.

2. Background Art

Traditionally, commercial aircraft have utilized a floor-mounted control wheel located in the cockpit. As is well-known in the art, the control wheel typically is turnable for controlling aircraft roll. Pushing and pulling the wheel toward and away from the panel controls aircraft pitch. This type of mechanism generally includes some form of a control column that is positioned directly in front of the pilot between his legs.

A problem associated with having a control column between a pilot's legs is that it tends to be uncomfortable during flight, and it impedes pilot ingress and egress to and from his or her seat. The present invention solves this problem by eliminating the control column and yet still provides a panel-mounted control wheel that operates the same.

DISCLOSURE OF THE INVENTION

The present invention is designed for use in a typical commercial aircraft cockpit which has located therein a control panel structure, and at least one seat for an aircraft pilot or operator. The control panel structure generally provides supporting or mounting structure for aircraft instrumentation in a position that is in front of the pilot where it can be seen easily. Positioned below the control panel structure are foot-operated rudder and brake controls. The present invention provides an improved panel-mounted control stick or control wheel mechanism for aircraft pitch and roll control that does not use a control column positioned between the operator's legs.

A mechanism in accordance with the invention includes a cylindrical control shaft that has an upper end extending at an angle rearwardly and upwardly into the cockpit, and a lower end extending at the same angle forwardly in front of the location where the pilot's feet are normally positioned when operating the aircraft's rudder or brakes. Connected to the upper end of the shaft is the control wheel, and the shaft's lower end is operably connected to structure which controls aircraft pitch and roll in response to control wheel movement. The shaft's angle is oriented at a certain optimum angle so that the control wheel is comfortably operable by the pilot, and so that the length of the shaft is generally positioned over and forwardly of the pilot's legs. This permits free leg movement from side to side below the shaft and the control panel structure.

Surrounding a portion of the shaft intermediate of its upper and lower ends is a housing that is slidably mounted to the control panel structure in a manner that will be further described later. Sliding the housing in and out of the structure causes translation of the control shaft's position which is used for pitch control. The housing slides along a predetermined path or direction which is angled relative to the angle of the shaft, and which is much nearer horizontal than the shaft angle. This, in turn, causes the control wheel to travel nearly horizontal as the shaft translates. In normal operation, of course, translation is accomplished by the pilot who pushes or pulls on the control wheel.

The shaft is rotationally connected to the slidable housing by suitable bearings which permit the shaft to rotate about its center line axis in direct response to turning movement of the control wheel. As mentioned above, pushing or pulling the control wheel causes shaft translation which further translates the shaft's lower end. The shaft's lower end is connected to a pitch control swing arm that is operable to adjust aircraft pitch in response to shaft movement. The shaft's lower end is further connected to a roll crank arm that is operable to adjust aircraft roll in response to turning of the shaft. Preferably, a conventional universal joint is utilized at the shaft's lower end to interconnect the shaft with both the pitch control swing arm and roll crank arm.

Returning to the above-mentioned slidable housing, this housing is part of a slider wheel assembly, mounted to the control panel structure, which includes both the housing and a plurality of four roller wheels. The housing has a pair of parallel guide rails which extend along opposite outside surfaces of the housing. Each guide rail transversely or laterally projects outwardly from its respective side of the housing and has a pair of beveled surfaces that extend along the length of the rail. This makes a total of four beveled surfaces for the two rails. The four roller wheels are rotationally mounted to the control panel structure where one wheel is positioned adjacent each beveled surface so the wheel's outer surface is in rolling contact therewith. The wheels in cooperation with the guide rails hold the housing in the control panel structure but permit it to slide, the wheels rolling along the beveled surfaces when this happens. The axes of rotation of all the slider wheels are mounted to the control panel structure in coplanar fashion and the direction of movement or translation of the housing is defined by the direction of the rails and their beveled surfaces.

An advantage to the invention is that it provides a light-weight pitch and roll control mechanism that operates in a conventional manner from the standpoint of the aircraft pilot, but which is simpler in design and easier to install in an aircraft cockpit than previous control wheel mechanism designs.

Another advantage to the invention is that it provides a control wheel that operates the same as a panel-mounted wheel in a general aviation aircraft, but without having any control directly in front of the wheel. The wheel translates back and forth generally horizontally, like a panel-mounted wheel. This is permitted by the angular relationship of the control shaft and the slider wheel housing. The desirability of this kind of arrangement is that it permits a control panel design that maximizes pilot down view and permits the location of instrumentation directly behind the wheel since no penetration of the panel is required.

Still another advantage to the invention is that since the invention eliminates a central control column, pilot comfort is improved and more efficient space utilization of the cockpit is made. Past control wheel designs required a certain amount of forward and aft seat adjustment to permit the pilot to remove his legs from around the control column. Eliminating the control column therefore eliminates the need for this particular seat adjustment which means any cockpit space behind the seat formerly required for seat travel can be eliminated. It is possible, for example, that this space can be converted into revenue creating cargo or passenger carrying space.

These advantages, and others, will become apparent upon considering the drawings in combination with the following detailed description of the invention.

BRIEF DESCRIPTION OF THE DRAWINGS

In the drawings, like reference numerals and letters refer to like parts throughout the various views, and:

FIG. 6 is a side view schematically illustrating an aircraft operator or pilot sitting in the cockpit or flight deck of an aircraft, and shows a pitch and roll control wheel mechanism constructed in accordance with the invention which utilizes the slider wheel assembly shown in FIGS. 1-3 and 5; and FIG. 7 is an end view of the control wheel mechanism shown in FIG. 6 looking forwardly in the cockpit.

BEST MODE FOR CARRYING OUT THE INVENTION

Figure 1:
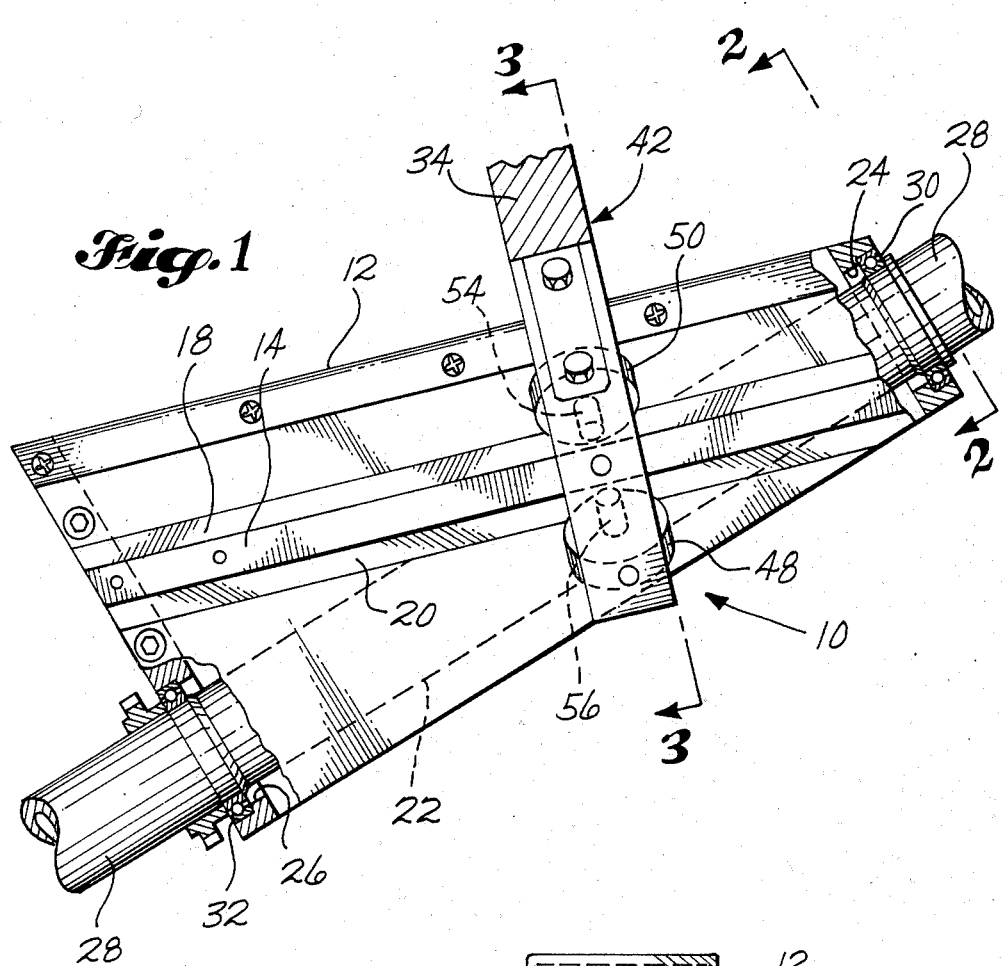
FIG. 1 is a side elevational view of a slider wheel assembly constructed in accordance with the invention for translating a control wheel shaft back and forth relative to an aircraft control panel.
Figure 2:
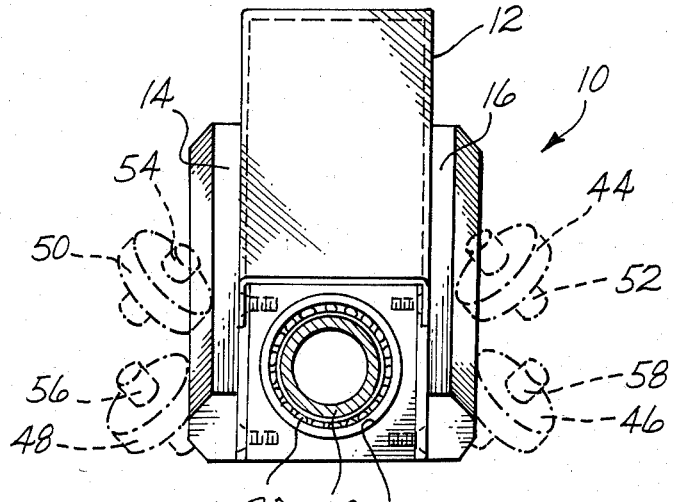
FIG. 2 is an end view of the assembly shown in FIG. 1, taken along line 2—2 in FIG. 1, and shows in dashed lines placement of roller wheels next to the guide rails of a housing in the assembly.

Referring now to the drawings, and first to FIG. 1, therein is shown at 10 a slider wheel assembly constructed in accordance with a preferred embodiment of the invention. The assembly has a housing 12 which includes a pair of parallel guide rails 14, 16 positioned on lateral outside surfaces of the housing. The rails 14, 16 extend along the length of the housing and each has a pair of first and second beveled surfaces 18, 20.

A passageway 22 having circular and concentric openings at opposite ends extends through the length of the housing 12. Positioned in the passageway 22 and extending through its end openings 24, 26, is a control shaft or stick 28. The shaft 28 is connected to the housing 12 by first and second annular bearings 30, 32 which surround the shaft 28, one bearing being positioned in each passageway opening 24, 26. The bearings 30, 32 provide a means for rotationally mounting the shaft 28 to the housing 12.

Referring now to FIG. 6, the assembly 10 of FIG. 1 is shown therein connected to a control panel structure that is generally indicated by dashed lines 34. Control panel structure of this kind is conventional and would be familar to a person skilled in the art. Generally, this structure supports an instrument panel, indicated at 36, upon which are located various aircraft gauges, sensors and other instruments. The boundaries of the aircraft cockpit or flight deck are generally indicated at 38, and the cockpit's window is generally indicated at 40.

Figure 3:
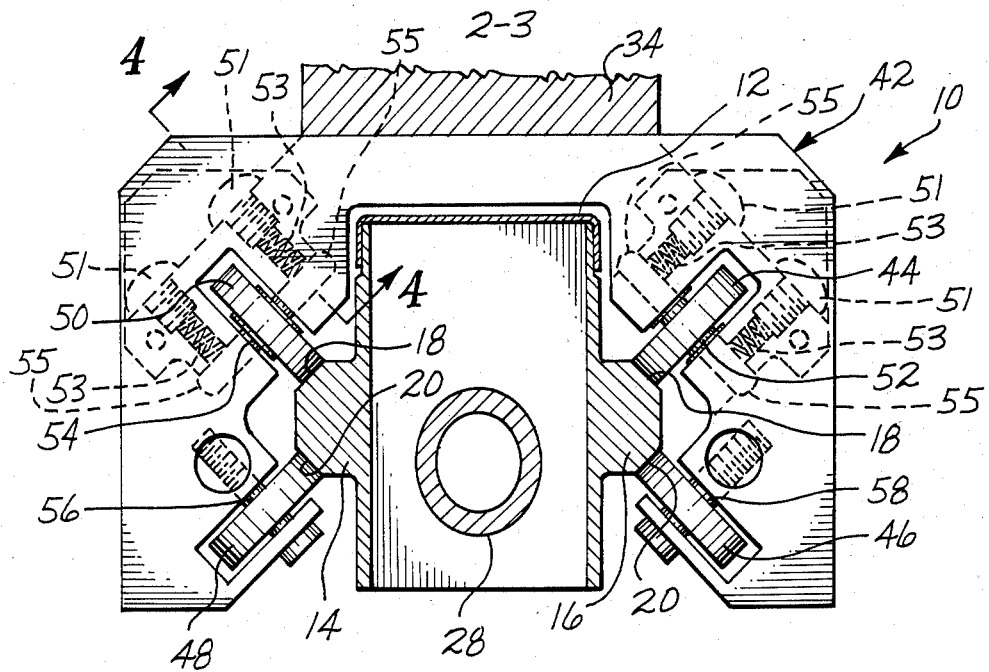
FIG. 3 is a cross-sectional view of the assembly shown in FIG. 1, taken along line 3—3 in FIG. 1, and shows how the roller wheels shown in FIG. 2 are connected to control panel structure and guide the housing back and forth.

The housing 12 of the assembly 10 is held in place in the structure 34 by a roller wheel portion of the assembly, indicated at 42, which is fixedly connected to the structure 34. The roller wheels 42 permit sliding movement of the housing 12 back and forth which further translates the shaft 28. This is best explained by now referring to FIG. 3. Therein is shown the roller wheels 42 which preferably include four roller wheels 44, 46, 48, 50. Each separate wheel 44, 46, 48, 50 is positioned next to one beveled surface 18, 20 of the two guide rails 14, 16. In other words, the two guide rails 14, 16 each have two beveled surfaces 18, 20, one facing upwardly and outwardly and the other facing downwardly and outwardly, which makes a total of four beveled surfaces. Each guide rail 14, 16 projects transversely or laterally outwardly and is positioned between a pair of wheels so that the outer surface of each wheel 44, 46, 48, 50 is in rolling contact with one of the beveled surfaces 18, 20. For example, rail 14 is positioned between wheels 48, 50 and rail 16 is positioned between wheels 44, 46. Each wheel 44, 46, 48, 50 has an axis of rotation defined by pins, indicated at 52, 54, 56, 58. The axes of rotation of all of the wheels 44, 46, 48, 50 are essentially coplanar in the roller wheel assembly 42. This causes the roller wheels 44, 46, 48, 50 to cooperate with each other to hold the housing's rails 14, 16 in position relative to the control panel structure 34 while at the same time permitting the rails to slide between the wheels as the wheels roll along the rails' beveled surfaces 18, 20.

Figure 4:
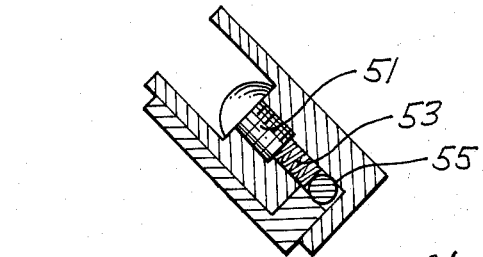
FIG. 4 is a cross-sectional view, taken along line 4—4 in FIG. 3, and shows the construction of an adjustment screw for changing the position of the roller wheels shown in FIGS. 1-3 relative to the housing's guide rails.

The position of the roller wheels 44, 46, 48, 50 may be adjusted relative to the guide rails 14, 16 by a plurality of adjustment screws, such as the screw 51 shown in FIG. 4. Tightening or loosening the screw 51 adjusts the compression of a spring 53 which acts against one end 55 of a roller wheel axel pin, like pins 52, 54, 56, 58 shown in FIG. 3. This, in turn, adjusts the reaction force between each wheel and its respective beveled surface 18, 20 as it rolls, making sliding movement of the housing 12 harder or easier depending upon screw adjustment.

Figure 5:
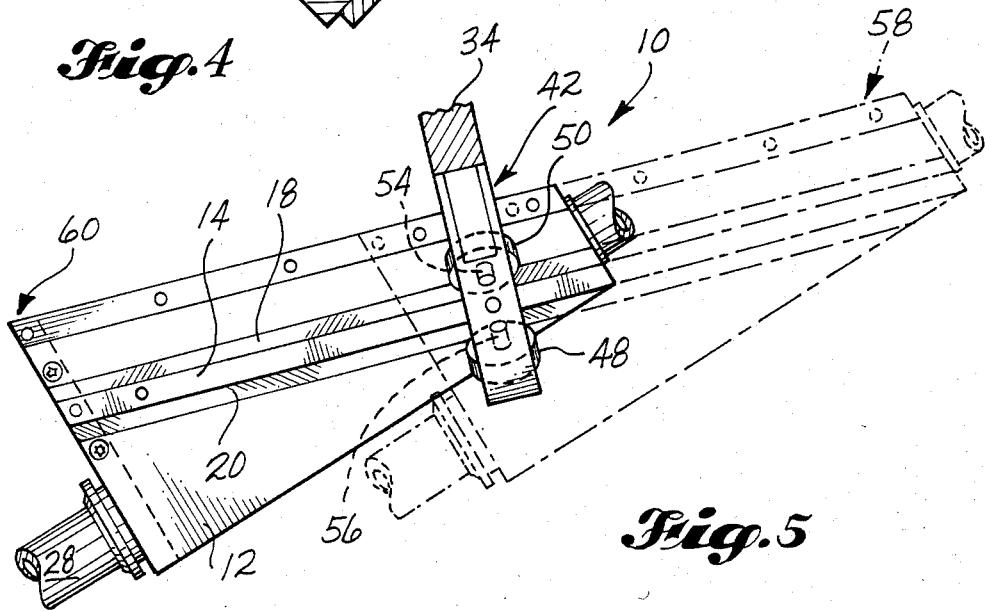
FIG. 5 is a view like FIG. 1, but shows translating movement of the housing shown in FIG. 1.

Sliding movement of the housing 12 causes the shaft 28 to translate between the positions indicated at 58 and 60 in FIGS. 5 and 6. The direction of housing translation is, of course, defined by the direction of the housing's guide rails 14, 16. Generally, the assembly 10 is mounted to the control panel structure 34 so that the housing 12 will translate nearly horizontally, as shown in FIG. 6.

In FIG. 6 is shown the position of the control shaft 28 relative to the aircraft operator or pilot 62. The shaft 28 is positioned at a certain optimum angle so that its entire length is positioned above the normal position of the pilot's legs 64. As is typical in most aircraft, positioned underneath the control panel structure 34 are aircraft rudder and brake controls indicated schematically at 66. The angular position of the shaft 28 does not interfere with the pilot's operation of these controls 66 and further, permits easy movement of the pilot's legs from side-to-side.

The upper end 68 of the shaft 28 extends rearwardly into the cockpit. Connected to this end 68 is a conventional control wheel 70. The end 68 extends sufficiently far enough into the cockpit so that the wheel 70 is comfortably operable by the pilot 62. The lower end 72 of the shaft extends generally forwardly of the pilot's feet 73, at least when the feet are in a normal position either at rest or operating the brake and rudder control 66.

Pushing or pulling the control wheel 70 causes the shaft 28 to translate back and forth. The direction of translation being defined by the direction of the housing's guide rails 14, 16 as described above. As can be seen in FIGS. 1 and 5, the shaft 28 extends through the housing 12 at an acute angle relative to the guide rails 14, 16. When the slider wheel assembly 10 is installed in the control panel structure, the angle of the guide rails 14, 16 is much nearer horizontal than the angle of the shaft 28. This means the control wheel 70 will translate in a direction near horizontal, which is the conventional mode of operation for most currently existing control wheel structure.

Connected to the lower end 72 of the shaft 28 is a conventional universal ("U") joint 74. The U-joint 74 interconnects the shaft 28 with a pitch control swing arm 75 and a roll crank arm 76. The pitch control swing arm 75 pivots about a point, indicated generally at 78 in FIG. 6, in response to translation of the shaft 28 as indicated by dashed lines 80 in FIG. 6. This pivotal movement is operable to adjust aircraft pitch in a conventionally known manner. Turning the control shaft 28 causes turning movement of the roll crank arm 76. This further causes movement of a guide bar 82 and another crank arm 84 which is operatively connected to other structure that controls aircraft roll in a conventionally known manner.

Thus, a preferred embodiment of the invention has been provided above. It is to be understood the above embodiment could be altered or changed without departing from the spirit and scope of the invention. The spirit and scope of the invention is not to be limited by the previous description, but is to be limited only by the subjoined patent claims which follow, wherein such claims are to be interpreted in accordance with legally established doctrines of patent claim interpretation.

What is claimed is:

1. For use in the cockpit of a commercial aircraft having located therein a control panel structure for displaying aircraft instrumentation and at least one seat for an aircraft operator, and further having foot-operated rudder and brake controls positioned underneath said control panel structure, wherein said operator's feet are normally positioned underneath said control panel structure when said operator is seated and operating said rudder and brake controls, an aircraft pitch and roll control apparatus, comprising:

an elongated control shaft having an upper end and a lower end, said shaft extending continuously in one piece along a center line axis from said upper end to said lower end, a control wheel being connected to said upper end;

a shaft-translating housing surrounding a portion of said control shaft intermediate of said shaft's upper and lower ends, said upper and lower ends each extending outwardly away from said housing;

bearing means for rotationally connecting said shaft to said housing in a manner so that said shaft is rotatable about said shaft's center line axis in response to turning of said control wheel by said aircraft operator;

means for slidably mounting said shaft-translating housing to said control panel structure, for moving said housing back and forth in a particular direction, wherein sliding movement of said housing back and forth correspondingly translates said shaft back and forth, and wherein said center line axis of said shaft extends at a certain fixed acute angle with respect to the direction of said shaft-translating movement, said shaft being positioned substantially above the legs of the operator when in a normal seated position, said shaft's upper end extending rearwardly at said fixed angle into said cockpit so that said control wheel is in a position that is comfortably operable by said operator, and said shaft's lower end extending forwardly at said fixed angle to a position located forwardly of the normal position of said operator's feet when seated;

a movable pitch control swing arm operable to adjust the pitch of said aircraft;

a movable roll crank arm operable to adjust roll of said aircraft; and connecting means operable to interconnect said control shaft's lower end with both said pitch control swing arm and said roll crank arm, in a manner so that translation of said shaft causes movement of said pitch control swing arm, to adjust aircraft pitch, and in a manner so that rotational turning of said shaft causes movement of said roll crank arm, to adjust aircraft roll.

2. The pitch and roll control apparatus of claim 1, wherein said means for slidably mounting said shaft-translating housing to said control panel structure comprises:

a pair of parallel guide rails extending along opposing outside surfaces of said housing, the direction of which defining the direction of translation of said housing and said control shaft, each guide rail laterally projecting outwardly away from its respective side of said housing, each rail having first and second beveled outer surfaces extending along the length of each rail in said direction of translation, and a plurality of roller wheels rotationally mounted to said control panel structure, including one roller wheel positioned adjacent each beveled outer surface of said rails, said one roller wheel being positioned so that said one roller wheel's outer surface is in rolling contact with said one roller wheel's respective beveled surface, wherein the axis of rotation of all said roller wheels are coplanar, and wherein the direction of said guide rails extend at an acute angle relative to the center line axis of said control shaft.

3. The pitch and roll control apparatus of claim 2, wherein said housing includes a passageway having first and second opposing coaxial and concentric end openings, said control shaft extending through said openings and said passageway, and said bearing means comprises first and second annular bearings each positioned, respectively, in one of said end openings and around said shaft, and connecting said shaft to said housing.

4. The pitch and roll control apparatus of claim 1, wherein said connecting means comprises a universal joint.

* * * * *